United States Patent [19]

Abe

[11] 3,832,528

[45] Aug. 27, 1974

[54] MICROFICHE FILM DETECTION DEVICE FOR MICRO-READERS AND MICRO-READER-PRINTERS

[75] Inventor: Takeshi Abe, Yokohama, Japan

[73] Assignee: Ricoh Co. Ltd., Tokyo, Japan

[22] Filed: Sept. 13, 1972

[21] Appl. No.: 288,559

[30] Foreign Application Priority Data

Sept. 14, 1971 Japan .............................. 46-70920
Oct. 1, 1971 Japan .............................. 46-76297

[52] U.S. Cl. .................... 235/61.11 E, 340/173 LT
[51] Int. Cl. .............................................. G06k 7/14
[58] Field of Search......................... 353/25, 26, 27; 235/61.11 E, 61.12 R; 209/111.7, 80.5; 340/173 LT

[56] References Cited

UNITED STATES PATENTS

| | | | |
|---|---|---|---|
| 3,034,643 | 5/1962 | Keller et al. | 235/61.12 R |
| 3,684,865 | 8/1972 | Sakamoto | 235/61.11 E |
| 3,731,060 | 5/1973 | Weinstein | 340/173 LT |

*Primary Examiner*—Thomas A. Robinson
*Attorney, Agent, or Firm*—Cooper, Dunham, Clark, Griffin & Moran

[57] ABSTRACT

Disclosed is a detection device for micro-readers and micro-reader-printers adapted to successively read out sets of code indications from microfiche film sheets stored in a storage case for the purpose of detecting and withdrawing from the case a desired film sheet. In one embodiment, the detection device comprises a detection light source, a detection light receiving element, at least one reflector attached to each of the microfiche film sheets stored in the film storage case, and a plurality of sets of code indications each provided on the surface of the reflector or on a portion of each microfiche film sheet which is disposed in the path of travel of the light from the detection light source when the microfiche film sheet is indexed to a sensing position. The reflector may be on a clip attached to a marginal portion of each film sheet or it may be on the film sheet storage case. Different embodiments of clips, reflectors and storage cases are disclosed.

11 Claims, 15 Drawing Figures

MICROFICHE FILM DETECTION DEVICE FOR MICRO-READERS AND MICRO-READER-PRINTERS

BACKGROUND OF THE INVENTION

The invention relates to microfiche film sheet detection devices for micro-readers and micro-reader-printers.

It is conventional to store in a storage case a multiplicity of microfiche film sheets each containing a number of frames and each having specific markings attached thereto, and to select a desired microfiche film sheet by reading out the specific markings. The markings hereto provided on microfiche film sheets have included notches of different shapes which are formed at the back ends of the clips attached to the individual microfiche film sheets stored in the storage case. These notches have been read out by mechanical means. In some cases, the microfiche film sheets have been in bags each provided with notches differing in shape from the notches of other bags. The notch system involves a complex process for forming notches and a complex mechanism for reading out the notches. Additionally, the notch system does not lend itself to high speed sensing and detection.

It is desirable therefore to provide a microfiche film detection device which permits markings to be provided on the microfiche film sheets in a manner which is convenient and fast, and it is desirable to provide a sensing and detection system which can operate at high speed.

SUMMARY OF THE INVENTION

The invention relates to microfiche film detection devices for micro-readers and micro-reader-printers. Its object is to obviate the disadvantages of the mechanical detection devices of the prior art and to provide a microfiche film detection device which permits providing identification markings on microfiche sheets through a convenient and fast process, and which enables high speed sensing of such markings.

One embodiment of the invention comprises a microfiche film detection device including a detection light source, a detection light receiving element, at least one reflector provided at each microfiche film sheet, and a set of code indications provided at the reflector of each microfiche film sheet or at a portion of each microfiche film sheet. The microfiche film sheets are successively moved to a sensing position. When a microfiche film sheet is in the sensing position, the code indications associated with it are disposed in the path of the detection light beam generated by the detection light source. The code indications modulate the beam, and the modulated beam is received at the detection light receiving element.

The detection device according to this invention relies for detection of the desired microfiche film sheet on direct reading of a set of code indications or markings by means of transmitted light or by means of reflected light. Thus, the invented detection device can operate at high speed and it does not require that the film sheets be moved from their storage case.

DETAILED DESCRIPTION

Figure 1:
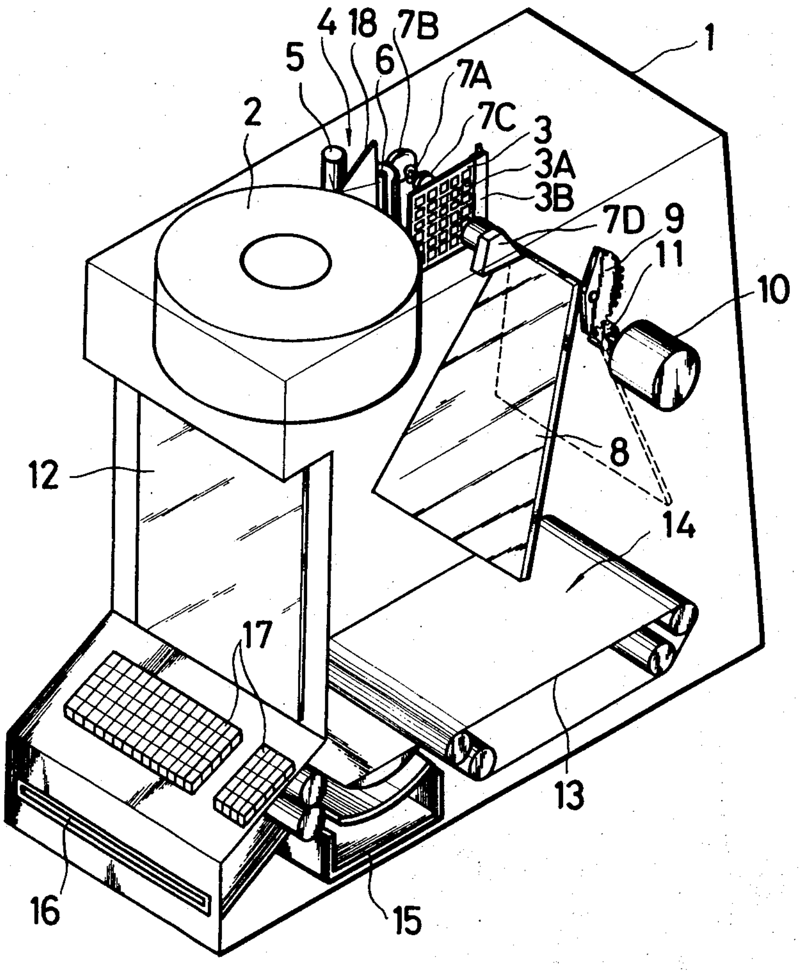
FIG. 1 is a schematic perspective view of a micro-reader-printer incorporating a detection device constructed and operating according to the subject invention.
Figure 2:
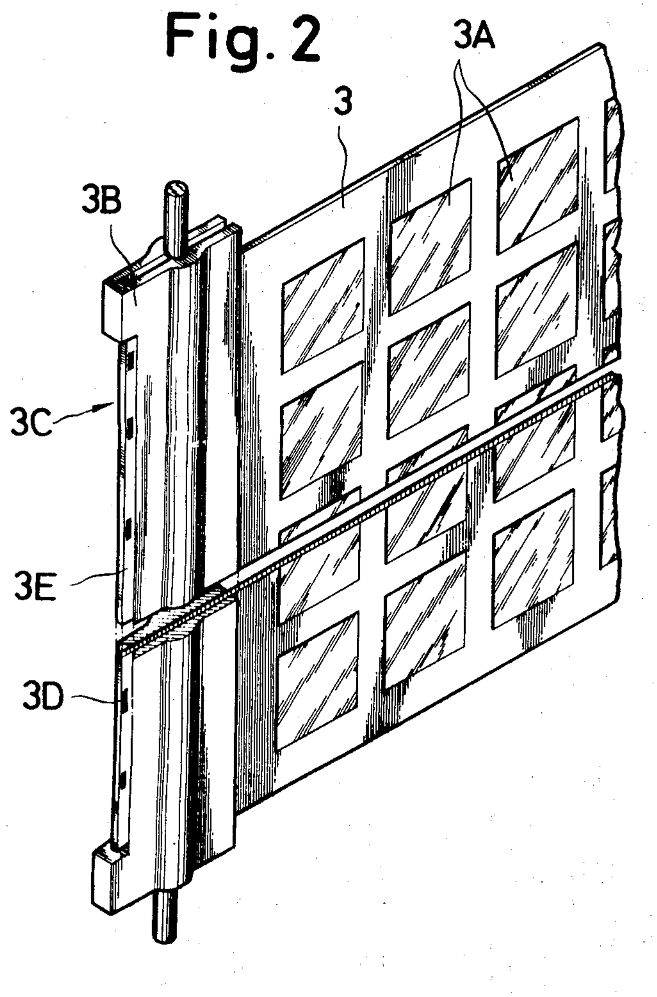
FIG. 2 is a perspective view of a microfiche film sheet used in the embodiment of the invention shown in FIG. 1.

Referring to FIG. 1, a film storage case 2 is rotatably mounted in the upper portion of a casing 1 of a micro-reader-printer. The film storage case 2 is cylindrical in shape and contains a multiplicity of radially arranged microfiche film sheets 3. Each microfiche film sheet 3 has a number of frames 3A each containing microfilmed information. Each microfiche film sheet 3 is provided with a clip 3B attached to one marginal portion of the film sheet 3 as shown in FIG. 2. Each film sheet 3 may be withdrawn from the storage case 2 to the read-out position shown in FIG. 1 by suitable withdrawal means.

A desired one of the microfiche film sheets 3 stored in the case 2 may be selected by means of sensing means 4 which include a detection light source 5 and a detection light receiving element 6. Once the desired microfiche film sheet has been selected by the sensing means 4, it may be withdrawn from the storage case 2 by suitable withdrawal means to the position illustrated in FIG. 1. Once it is in that position, the information of a selected frame 3A may be read out by means of an optical system comprising a light source 7A, a reflector 7B, a lens system 7C and a reflector 7D. When the withdrawn microfiche film sheet 3 is in the read-out position shown in FIG. 1, it is interposed between the lens system 7C and reflector 7D. Another reflector 8 which is pivotally supported by a shaft is located below the reflector 7D, and the shaft has fixed thereto a segmental gear 9 which engages a pinion 11 of a motor 10. When it is desired to display the information of a selected frame 3A, the reflector 8 is in the solid line position shown in FIG. 1, so that it reflects the image of the selected frame 3A toward a screen 12 provided at the front side of the casing 1. When it is desired to permanently record the information of the selected frame 3A, the reflector 8 is moved to the broken line position shown in FIG. 1, so that the reflector 7D projects an image of the frame toward an exposing position 14. A photosensitive sheet (not shown) may be disposed on a conveyor belt 13 at the exposing position 14 to record the projected image. The photosensitive sheet may be moved by the conveyor belt 13 toward a developing device 15 to be developed therein and the developed photosensitive sheet may be ejected through a photosensitive sheet outlet port 16. A desired microfiche film sheet 3 may be selected by means of setting selected buttons of a pushbutton means 17, and a changeover switch (not shown) may be used to determine whether a selected frame 3A will be projected on the screen 12 or will be printed on a photosensitive sheet.

Referring to FIG. 2, each of the microfiche film sheets 3 includes a clip 3B attached to one marginal portion thereof. Each of the clips 3B has a cutout 3C which exposes to view a marginal side portion 3E of the film sheet. A set of code indications or markings 3D is provided on the marginal portion 3E of the film sheet.

Figure 3:
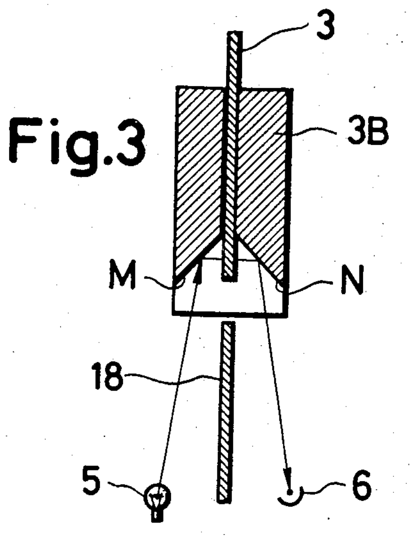
FIG. 3 is a detailed partial view of one embodiment of the detection device shown in FIG. 1.

Referring to FIG. 3, the cutout 3C of the clip 3B is V-shaped in horizontal cross-section and has two inclined surfaces M and N which are mirror surfaced to reflect light. A light beam emanating from the light source 5 is thus reflected from the mirror surface M toward the marginal portion 3E of the film sheet 3 and the beam portion which is transmitted through the marginal portion 3E of the film sheet is reflected by the mirror surface N toward the light receiving element 6. Thus, the beam from the light source 5 is modulated by the code indications on the marginal portion 3E of the film sheet 3 and the light receiving element 6 receives a modulated beam and provides an output signal which is a function of the code indications on the film sheet 3. Light from the light source 5 is prevented from directly reaching the light receiving element 6 by means of a light intercepting plate 18.

Figure 4:
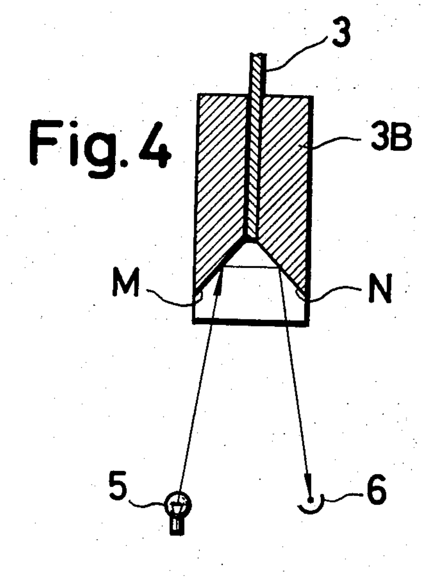
FIGS. 4 and 5 are detailed partial views of other embodiments of the detection device shown in FIG. 1.

As an alternative to providing code indications on the marginal portion 3E of the film sheet, code indications may be provided directly on at least one of the inclined surfaces M and N. This embodiment is shown in FIG. 4, and differs from the embodiment shown in FIG. 3 in that there is no marginal portion 3E, and in that code indications are provided either on the surface M or on the surface N or on both surfaces M and N.

In one commonly used type of microfiche film sheets, the thickness of the clips is about 2 millimeters. Thus, the mirror surfaces M and N are relatively thin long strips, and the intensity of the light beam reflected thereby is limited. It is desirable that the intensity of the reflected light beam be as great as possible in order to insure unambiguous detection. Accordingly, an embodiment is illustrated in FIG. 5 in which the intensity of the beam incident on the light receiving element 6 is increased without increasing the dimensions of the clips 3B.

Figure 5:
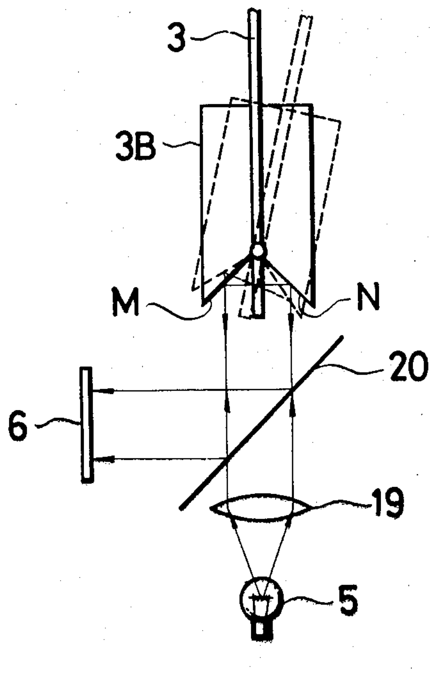

Referring to FIG. 5, a light beam emanating from the light source 5 passes through a condenser lens 19 and through a half mirror 20, and is then reflected from both inclined mirror surfaces M and N back to the half mirror 20. In particular, the component of the beam which is incident on the surface M is reflected toward the surface N and is reflected therefrom toward the mirror 20, and the component which is incident on the surface N is reflected therefrom toward the surface M and is reflected thereby toward the mirror 20. Thus, each of the beam components which is returned toward the mirror 20 passes through the marginal portion 3E of the microfiche film sheet, which marginal portion carries the code indications serving to identify the particular microfiche film sheet 3. It is noted that the intensity of the light beam incident on the light receiving element 6 in the embodiment of FIG. 5 is about twice as much as with the embodiment shown in FIG. 3.

The embodiment shown in FIG. 5 has the added advantage that the microfiche film sheet 3 need not be perfectly oriented with respect to the detection device 4. In particular, even if the microfiche film sheet 3 is tilted as shown in broken lines in FIG. 5, the light beam reflected from the surfaces M and N still returns at the desired position on the half mirror 20, as shown in FIG. 5.

The set of code indications 3D provided on the marginal portion 3E of the film sheet 3 may be formed by superimposing the code indications 3D at the time information is microfilmed at the frames 3A of the sheet 3. Additionally, code indications may be marked in by hand on either one or on both of the inclined surfaces M and N, and can be read out together with the set of code indications formed on the marginal portion of the film sheet. The set of code indications 3D on the marginal portion 3E of the film sheet may be formed by means of a computer output microfilmer connected to a conventional digital computer.

Figure 6:
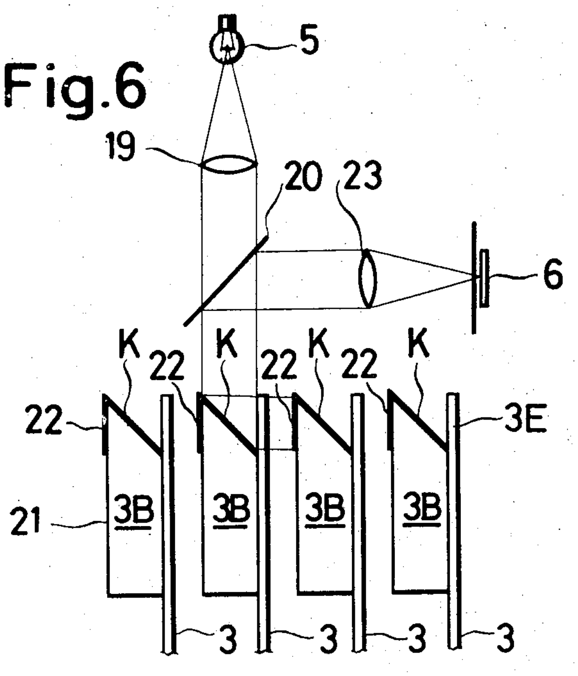
FIGS. 6 through 10 show examples of reflectors provided at one inclined surface of a clip attached to a microfiche film sheet.

An alternative manner of providing code indications on microfiche film sheets is illustrated in FIG. 6. In FIG. 6, microfiche film sheets 3 are stored in a rotatable or slidable film storage case similar to the case 2. The microfiche film sheets 3 in FIG. 6 are disposed side by side, and each has a clip 3B bonded to one marginal portion thereof, for example by means of dual surface tape. Each clip 3B in FIG. 6 is provided with an inclined surface K disposed lengthwise of the clip to form a wedge-shaped space between the marginal portion 3E of the film 3 and the inclined surface K of the clip 3B. Preferably, a side surface 21 of the clip 3B, which is adjacent the inclined surface K, is parallel to the film sheet 3, and the inclined surface K forms an angle of about 45° with both the side surface 21 and with the film sheet 3. The inclined surface K of each clip 3B is preferably mirror surfaced, and the side surface 21 of each clip 3B is provided with a light reflecting portion 22.

In the embodiment shown in FIG. 6, each microfiche film sheet 3 is provided, at its marginal portion 3E, with a specific set of code indications which identify the individual microfiche film sheets 3.

Read-out of the code indications in the embodiment of FIG. 6 is effected by means of a detection light source 5, a condenser lens 19, a half mirror 20, a lens 23 and a light receiving element 6. The light beam emanating from the light source 5 is shaped by the lens 19, passes through the half mirror 20 and is reflected by the inclined surface K of a clip 3B, through the marginal portion 3E of the film 3 to which the clip is attached, and toward the reflecting surface 22 of the ajdacent clip 3B. The beam is reflected by the surface 22 back to the inclined surface K, back to the half mirror 20, and toward the light receiving element 6, through the lens 23. The beam received at the light receiving element 6 is modulated by the code indications on the film sheet 3 to which the inclined surface K is attached. A sensing circuit (not shown) receives the electrical output of the light receiving element 6 and compares it with a set of electrical signals provided by means of the pushbutton means 17 (FIG. 1) to determine if this is the desired microfiche film sheet 3. When the desired correspondence between the output of the light receiving element 6 and the signals provided by means of the pushbutton means 17 exists, the particular film sheet 3 may be withdrawn from the storage case to the read-out position shown in FIG. 1.

Figure 7:
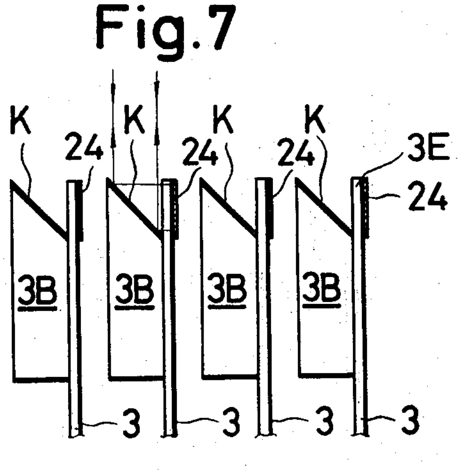

The detection device shown in FIG. 6 may be used in conjunction with a modified microfiche film sheet of the type shown in FIG. 7. Referring to FIG. 7, each of the clips 3B is provided with a light reflecting portion 24 which is in a form of a strip attached to the marginal portion of the film sheet 3 opposite the reflecting surface K. In the embodiment of FIG. 7, a beam of light which is generated and detected in the same manner as in FIG. 6 is reflected by the reflecting surface K toward the reflecting surface 24, back to the reflecting surface K and then back to the half mirror 20. In the embodiment shown in FIG. 7, reflection does not depend on an adjacent film clip, but is carried out entirely by the clip 3B of the interrogated microfiche film sheet 3.

Figure 8:
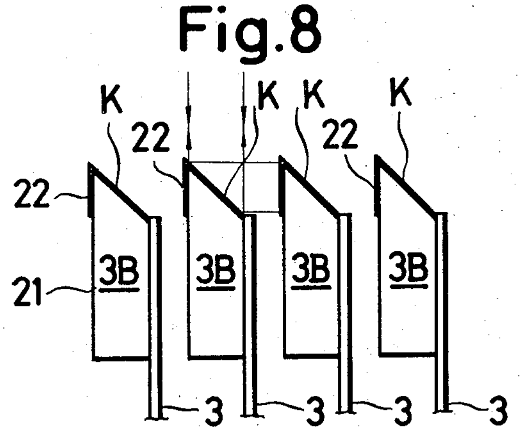

Another alternative embodiment is shown in FIG. 8. It is associated with the same light beam generating and detecting means as in the embodiment of FIG. 6, but code indications are provided on the inclined surface K itself, and the light beam from the light source 5 (FIG. 6) is reflected from the reflecting surface K toward a reflecting surface 22 provided on the adjacent film clip 3B, back to the reflecting surface K, then back to the half mirror 20.

Figure 9:
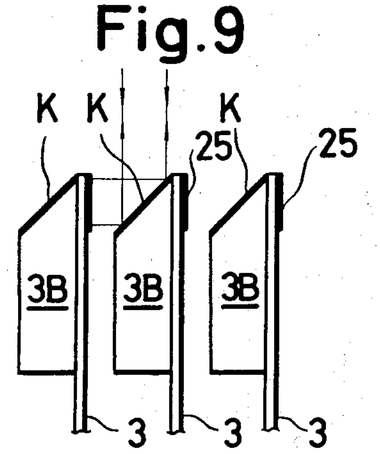
Figure 10:
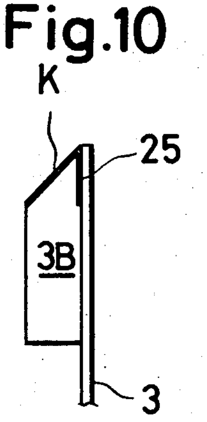

A still alternative embodiment is shown in FIG. 9. The embodiment in FIG. 9 is distinguished from that in FIG. 8 in that the inclined surface K in FIG. 9 reflects the light beam in a direction opposite of that in FIG. 8, toward a reflecting surface 25 provided on the adjacent microfiche film sheet 3. In the embodiment of FIG. 9, a set of code indications is provided on the inclined surface K of each clip 3B. A light reflecting portion 25 may be provided on each of the clips 3B of FIG. 9 as shown in FIG. 10. Clips of the type shown in FIG. 10 may be used in place of each of the clips 3B shown in FIG. 9.

Preferably, the clips 3B are made of plastic and their reflecting surfaces are formed by plating the plastic with a metal to provide a mirror surface thereon. Alternately, the clips 3B may be made of aluminum and a coating of a synthetic resinous material may be applied to the inclined surfaces thereof after treating with diamond. The clips 3B may be bonded to the film sheets 3 by means of ultrasonic waves. When the clips 3B are made of metal, the mirror surfaces thereof may be formed by plating with metal after polishing. If the metal used for the clips 3B is stainless steel, the mirror surfaces thereon can be formed by simply polishing. It is preferable that the light reflecting surfaces of each clip 3B be mirror surfaces, but this is not essential; diffusion surfaces may be used instead.

Alternative embodiments for providing code indications and reflecting surfaces are shown in FIGS. 11 through 15, where the storage case 2 for microfiche film sheets is utilized to provide reflecting surfaces.

Figure 11:
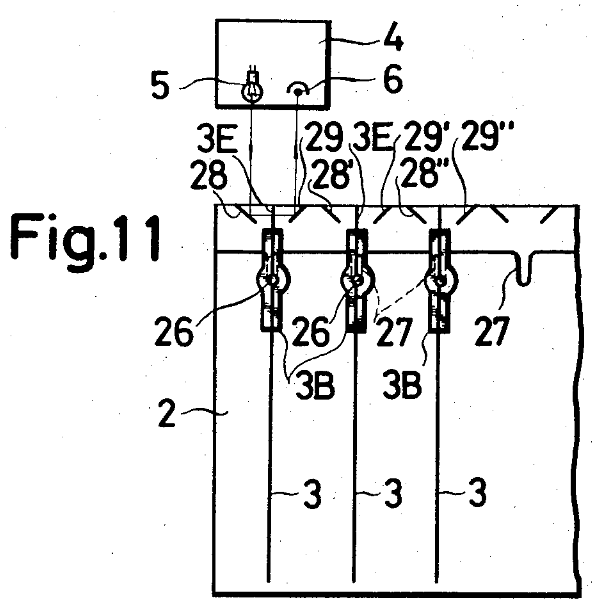
FIG. 11 shows an embodiment in which a reflector is provided in a storage case for microfiche film sheets.
Figure 12:
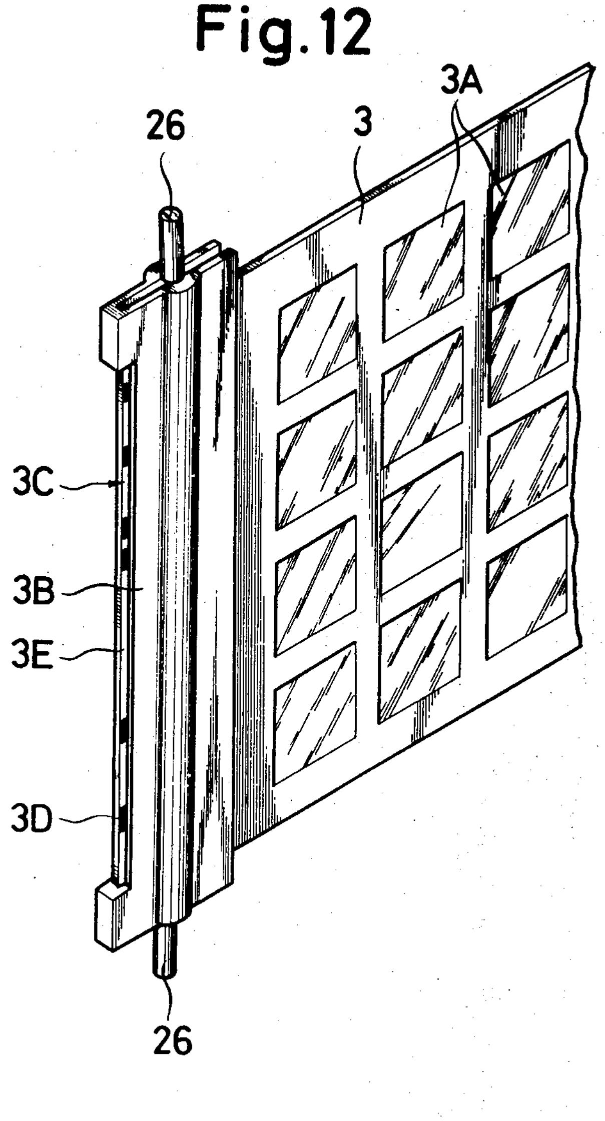
FIG. 12 is a perspective view of a microfiche film sheet adapted for use in the embodiment shown in FIG. 11.

Referring to FIG. 11, a number of microfiche film sheets 3 are stored in a film storage case 2 which is slidably mounted. Each microfiche film sheet 3 has a clip 3B attached to a marginal portion thereof as shown in FIG. 12. Referring to FIG. 12, the clip 3B is formed with a cutout 3C which exposes a side marginal portion 3E of the film sheet 3. A set of code indications 3D are provided on the marginal portion 3E of the film sheet 3. The clip 3B includes a pair of longitudinally opposite projections 26 which are utilized in mounting the microfiche film sheets 3 in the case 2.

Referring again to FIG. 11, each microfiche film sheet 3 is stored in the storage case 2 with the projections 26 thereof supported by recesses 27 each formed in one of the two opposite side plates of the case 2. Pairs of facing reflectors 28 and 29, 28′ and 29′, 28″ and 29″, etc. are disposed between the two side plates of the case 2 in which the recesses 27 are formed. The reflectors of each pair of reflectors flank the marginal portion 3E of a film sheet 3.

The code indications of the film sheets 3 in the storage case 2 are read out by sensing means 4 which include a detection light source 5 and a light receiving element 6. The storage case 2 is moved in sliding motion to index a microfiche film sheet 3 with the detection means 4, such that the light beam from the source 5 is reflected by the surface 28, passes through the marginal portion 3E of a microfiche film sheet 3 and is reflected back to the light receiving element 6 by the reflecting surface 29. Thus, an image of the code indications on the marginal portion 3E of the sheet 3 is received by the light receiving element 6, and corresponding electrical signals are generated therein. These electrical signals are supplied to a comparison circuit (not shown) where they are compared with a set of code indications provided by the pushbutton means 17 (FIG. 1). If the comparison means indicates coincidence, then the case 2 may be stopped at a position where the selected microfiche film sheet 3 is indexed with withdrawal means, and the microfiche film sheet may be withdrawn for reading out the information of a selected frame 3A thereof.

Figure 13:
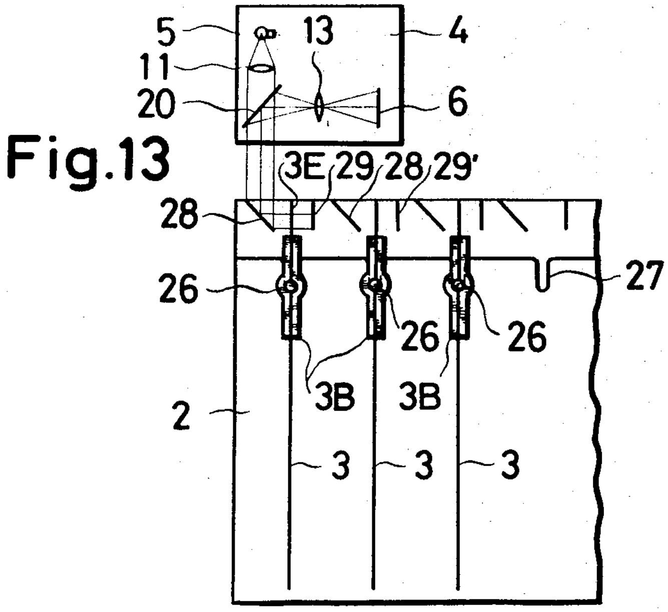
FIGS. 13 through 15 show modifications of the embodiment shown in FIG. 11.

An alternative embodiment similar to that of FIG. 11 is shown in FIG. 13. Referring to FIG. 13, the light from a light source 5 of the sensing means 4 passes through a lens 19 and through a half mirror 20 and is reflected by a reflector 28 toward another reflector 29. The reflector 29 reflects the light beam back to the reflector 28, back to the mirror 20, and the mirror 20 reflects it, through a lens 13, toward a light receiving element 6. The marginal portion 3E of the film sheet 3, which marginal portion carries code indications, is interposed in the path of the beam between the reflectors 28 and 29. The reflector 29 may be replaced by a reflection tape bonded to the marginal portion 3E of the film sheet 3 opposite the reflector 28.

In the embodiments shown in FIGS. 11 and 13, elongated reflectors 28 and 29, etc. are disposed between the two side plates of the storage case 2. An alternative method of providing for the function of at least one of the reflectors 28 and 29 is shown in the embodiment illustrated in FIG. 14.

Figure 14:
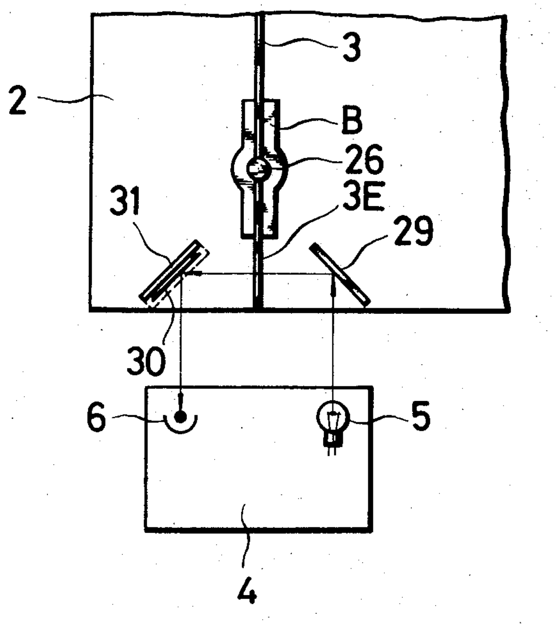
Figure 15:
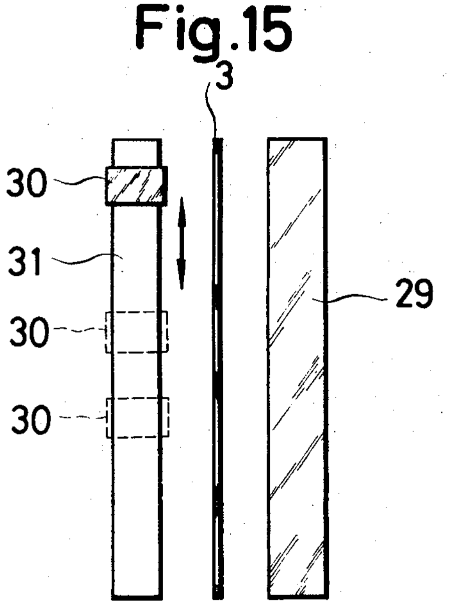

Referring to FIG. 14, the function of the reflector 28 of the embodiment of FIGS. 11 and 13 is taken over by a small reflector 30 which is slidably mounted on a suitable support table 31 to move up and down along the length of the marginal portion 3E of a microfiche film sheet 3 together with a sensing means 4 comprising a light source 5 and a light receiving element 6. As shown in FIG. 15, the small reflector 30 can move up and down along the table 31 to scan the code indications provided on the marginal portion 3E of a film sheet 3. The embodiment illustrated in FIGS. 14 and 15 offers the advantage of permitting the use of a very small optical system.

The subject invention is applicable to micro-readers and micro-reader-printers which have cylindrical film storage cases as shown in FIG. 1, slidable film storage cases as discussed in connection with FIGS. 11 through 15, for example, or storage cases which are differently shaped. The film storage case may be moved with respect to the sensing means 4, as discussed above, or alternately, the sensing means 4 may be moved with respect to the film storage case 2.

In the embodiments discussed in connection with FIGS. 11 through 15, the clips 3B may be made of metal, such as aluminum, or of synthetic resinous material. When the clips 3B are made of a transparent acrylic resin, the clip need not be formed with the cutout 3C. The light beam from the sensing means 4 can be transmitted through the clip and through the marginal portion of each microfilm sheet on which a set of code indications is provided. Alternately, a set of code indications may be provided on one surface of the clip and the light beam from the sensing means 4 may be directed thereto.

I claim:

1. A microfiche film sheet detection device for successively reading out sets of code indications each associated with a microfiche film sheet for the purpose of selecting a desired microfiche film sheet, comprising: a storage case storing a multiplicity of microfiche film sheets, a multiplicity of reflectors interspersed with the stored microfiche film sheets, with each microfiche film sheet positioned adjacent to and associated with at least one of said reflectors to form therewith a group comprising a microfiche film sheet and at least one associated reflector, and code indications provided on at least one of the microfiche film sheet and the at least one reflector of each of said groups, means for successively indexing each of said groups with a sensing position, and sensing means comprising a detection light source for generating a detection light beam incident on the code indications of the group indexed to said sensing position and reflected by the at least one reflector of the group as a reflected beam modulated by said code indications of the group, and detection light receiving means interposed in the path of said modulated and reflected beam, whereby the receiving means may generate a signal which is a function of the code indications of the group at the sensing position, which signal may be compared with a defined signal identifying a desired microfiche film sheet to determine thereby if the microfiche film sheet which is at the sensing position is the desired microfiche film sheet, wherein the microfiche film sheets in the storage case are arranged next to and substantially parallel to each other, and wherein each microfiche film sheet is provided with a clip attached to an edge marginal portion thereof and having a portion extending from the clip toward the sensing means, said extending portion of the clip including a first reflector and a second reflector, said first reflector of the microfiche film sheet which is in the sensing position interposed in the path of the detection light beam and reflecting the beam toward the second reflector of an adjacent microfiche film sheet, and said second reflector of the adjacent microfiche film sheet reflecting the beam impinging thereon back to the first reflector of the microfiche film sheet which is in the sensing position to be reflected thereby toward said detection light beam receiving means.

2. A microfiche film sheet detection device for successively reading out sets of code indications each associated with a microfiche film sheet for the purpose of selecting a desired microfiche film sheet, comprising: a storage case storing a multiplicity of microfiche film sheets, a multiplicity of reflectors interspersed with the stored microfiche film sheets, with each microfiche film sheet positioned adjacent to and associated with at least one of said reflectors to form therewith a group comprising a microfiche film sheet and at least one associated reflector, and code indications provided on at least one of the microfiche film sheet and the at least one reflector of each of said groups, means for successively indexing each of said groups with a sensing position, and sensing means comprising a detection light source for generating a detection light beam incident on the code indications of the group indexed to said sensing position and reflected by the at least one reflector of the group as a reflected beam modulated by said code indications of the group, and detection light receiving means interposed in the path of said modulated and reflected beam, whereby the receiving means may generate a signal which is a function of the code indications of the group at the sensing position, which signal may be compared with a defined signal identifying a desired microfiche film sheet to determine thereby if the microfiche film sheet which is at the sensing position is the desired microfiche film sheet, wherein the microfiche film sheets in the storage case are arranged next to and substantially parallel to each other, and wherein each microfiche film sheet is provided with a clip attached to an edge marginal portion thereof and having a first and a second reflector, the first reflector of a microfiche film sheet which is in the sensing position being interposed in the path of the detection light beam and reflecting said beam toward the second reflector of an adjacent microfiche film sheet, said second reflector of the adjacent microfiche film sheet reflecting the beam impinging thereon back to the first reflector of the microfiche film sheet in the sensing position, said beam reflected thereby toward the detection light beam receiving means.

3. A microfiche film sheet detection device as in claim 2 wherein the second reflector of a microfiche film sheet is positioned at the opposite side of the sheet from said first reflector.

4. A microfiche film sheet detection device as in claim 2 wherein the second reflector of a microfiche film sheet is positioned on the same side of the sheet as the first reflector.

5. A microfiche film sheet detection device for successively reading out sets of code indications each associated with a microfiche film sheet for the purpose of selecting a desired microfiche film sheet, comprising: a storage case storing a multiplicity of microfiche film sheets, a multiplicity of reflectors interspersed with the stored microfiche film sheets, with each microfiche film sheet positioned adjacent to and associated with at least one of said reflectors to form therewith a group comprising a microfiche film sheet and at least one associated reflector, and code indications provided on at least one of the microfiche film sheet and the at least one reflector of each of said groups, means for successively indexing each of said groups with a sensing position, and sensing means comprising a detection light source for generating a detection light beam incident on the code indications of the group indexed to said sensing position and reflected by the at least one reflector of the group as a reflected beam modulated by said code indications of the group, and detection light receiving means interposed in the path of said modulated and reflected beam, whereby the receiving means may generate a signal which is a function of the code indications of the group at the sensing position, which signal may be compared with a defined signal identifying a desired microfiche film sheet to determine thereby if the microfiche film sheet which is at the sensing position is the desired microfiche film sheet, wherein the storage case includes a first and a second reflector flanking an edge marginal portion of each microfiche film sheet stored in the storage case and wherein said detection light beam is reflected by each of said first and second reflector of the group indexed to said sensing position.

6. A microfiche film sheet detection device as in claim 5 wherein the first reflector of a microfiche film sheet which is in the sensing position is interposed in the path of the detection light beam and reflects the beam toward the second reflector thorugh the marginal portion of the microfiche film sheet in the sensing position, and the second reflector reflects the beam impinging thereon toward the detection light beam receiving means.

7. A microfiche film sheet detection device as in claim 5 wherein the first reflector of a microfiche film sheet which is in the sensing position is interposed in the path of the detection light beam and reflects the beam toward the second reflector of the same sheet through the edge portion of the sheet, and wherein the second reflector of the same sheet reflects the beam impinging thereon back to the first reflector to be reflected thereby toward the detection light beam receiving means.

8. A microfiche film sheet detection device for successively reading out sets of code indications each associated with a microfiche film sheet for the purpose of selecting a desired microfiche film sheet, comprising: a storage case storing a multiplicity of microfiche film sheets, a multiplicity of reflectors interspersed with the stored microfiche film sheets, with each microfiche film sheet positioned adjacent to and associated with at least one of said reflectors to form therewith a group comprising a microfiche film sheet and at least one associated reflector, and code indications provided on at least one of the microfiche film sheet and the at least one reflector of each of said groups, means for successively indexing each of said groups with a sensing position, and sensing means comprising a detection light source for generating a detection light beam incident on the code indications of the group indexed to said sensing position and reflected by the at least one reflector of the group as a reflected beam modulated by said code indications of the group, and detection light receiving means interposed in the path of said modulated and reflected beam, whereby the receiving means may generate a signal which is a function of the code indications of the group at the sensing position, which signal may be compared with a defined signal identifying a desired microfiche film sheet to determine thereby if the microfiche film sheet which is at the sensing position is the desired microfiche film sheet, wherein the storage case includes a first reflector facing an edge marginal portion of each microfiche film sheet stored therein, and wherein the sensing means includes a sensing reflector which is positioned on the opposite side of the reflector of the microfiche film sheet which is in the sensing position, and means for moving the sensing reflector along the marginal portion of the microfiche film sheet which is in the sensing position, which marginal portion is between the reflector of that sheet and the sensing reflector.

9. A microfiche film sheet detection device for successively reading out sets of code indications each associated with a microfiche film sheet for the purpose of selecting a desired microfiche film sheet, comprising: a storage case storing a multiplicity of microfiche film sheets, a multiplicity of reflectors interspersed with the stored microfiche film sheets, with each microfiche film sheet positioned adjacent to and associated with at least one of said reflectors to form therewith a group comprising a microfiche film sheet and at least one associated reflector, and code indications provided on at least one of the microfiche film sheet and the at least one reflector of each of said groups, means for successively indexing each of said groups with a sensing position, and sensing means comprising a detection light source for generating a detection light beam incident on the code indications of the group indexed to said sensing position and reflected by the at least one reflector of the group as a reflected beam modulated by said code indications of the group, and detection light receiving means interposed in the path of said modulated and reflected beam, whereby the receiving means may generate a signal which is a function of the code indications of the group at the sensing position, which signal may be compared with a defined signal identifying a desired microfiche film sheet to determine thereby if the microfiche film sheet which is at the sensing position is the desired microfiche film sheet, wherein each of said microfiche film sheets is provided with a clip attached to a portion thereof and provided with a cutout exposing a marginal portion of the microfiche film sheet, said clip having a first and a second reflecting surface angled with respect to each other and flanking the exposed marginal portion of the microfiche film sheet, the first reflecting surface being in the path of the detection light beam and reflecting the beam through the exposed portion of the microfiche film sheet toward the second reflecting surface, and the second reflecting surface reflecting the beam incident thereon toward the detection light receiving means, whereby the beam from the detection light source is modulated by the code indications provided on at least one of said first and second reflectors and marginal portion of the microfiche film sheet prior to impinging on the receiving means, and wherein the detection light source means include means for separating the detection light beam into a first and a second beam impinging respectively on said first and second reflecting surfaces, and wherein the light receiving means include means interposed in the path of the beams reflected from said first and second reflecting surfaces and reflecting said reflected beams toward the light receiving means.

10. A microfiche film sheet detection device for successively reading out sets of code indications each associated with a microfiche film sheet for the purpose of selecting a desired microfiche film sheet, comprising: a storage case storing a multiplicity of microfiche film sheets, a multiplicity of reflectors interspersed with the stored microfiche film sheets, with each microfiche film sheet positioned adjacent to and associated with at least one of said reflectors to form therewith a group comprising a microfiche film sheet and at least one associated reflector, and code indications provided on at least one of the microfiche film sheet and the at least one reflector of each of said groups, means for successively indexing each of said groups with a sensing position, and sensing means comprising a detection light source for generating a detection light beam incident on the code indications of the group indexed to said sensing position and reflected by the at least one reflector of the group as a reflected beam modulated by said code indications of the group, and detection light receiving means interposed in the path of said modulated and reflected beam, whereby the receiving means may generate a signal which is a function of the code indications of the group at the sensing position, which signal may be compared with a defined signal identifying a desired microfiche film sheet to determine thereby if the microfiche film sheet which is at the sensing position is the desired microfiche film sheet, wherein the microfiche film sheets in the storage case are arranged next to and substantially parallel to each other, and wherein each of the microfiche film sheets is provided with a clip attached to a marginal portion thereof and having a cutout exposing a marginal edge of the microfiche film sheet, said cutout having a first reflecting surface facing the exposed marginal edge of the microfiche film sheet and interposed in the path of the detection light beam when the microfiche film sheet is in the sensing position for reflecting the beam toward said exposed marginal edge of the microfiche film sheet, and wherein the microfiche film sheets in the storage case are stacked with their clips arranged next to and substantially parallel to each other, and wherein each clip includes a second reflecting surface facing the first reflecting surface of an adjacent clip and reflecting back to said first reflecting surface of the adjacent clip the detection light beam reflected thereby, and wherein the detection light receiving means include a half mirror interposed in the path of the light beam impinging on the first reflecting surface of the adjacent clip from the second reflecting surface and reflected by said first reflecting surface.

11. A microfiche film sheet detection device for successively reading out sets of code indications each associated with a microfiche film sheet for the purpose of selecting a desired microfiche film sheet, comprising: a storage case storing a multiplicity of microfiche film sheets, a multiplicity of reflectors interspersed with the stored microfiche film sheets, with each microfiche film sheet positioned adjacent to and associated with at least one of said reflectors to form therewith a group comprising a microfiche film sheet and at least one associated reflector, and code indications provided on at least one of the microfiche film sheet and the at least one reflector of each of said groups, means for successively indexing each of said groups with a sensing position, and sensing means comprising a detection light source for generating a detection light beam incident on the code indications of the group indexed to said sensing position and reflected by the at least one reflector of the group as a reflected beam modulated by said code indications of the group, and detection light receiving means interposed in the path of said modulated and reflected beam, whereby the receiving means may generate a signal which is a function of the code indications of the group at the sensing position, which signal may be compared with a defined signal identifying a desired microfiche film sheet to determine thereby if the microfiche film sheet which is at the sensing position is the desired microfiche film sheet, wherein the microfiche film sheets in the storage case are arranged next to and substantially parallel to each other, and wherein each of the microfiche film sheets is provided with a clip attached to a marginal portion thereof and having a cutout exposing a marginal edge of the microfiche film sheet, said cutout having a first reflecting surface facing the exposed marginal edge of the microfiche film sheet and interposed in the path of the detection light beam when the microfiche film sheet is in the sensing position for reflecting the beam toward said exposed marginal edge of the microfiche film sheet, and wherein each of the microfiche film sheets includes a second reflecting surface facing the exposed marginal edge of the microfiche film sheet and disposed at the opposite side thereof of said first reflecting surface, said second reflecting surface reflecting back toward the first reflecting surface, the detection light beam from the detection light source which is reflected by said first reflecting surface toward the marginal edge portion of the microfiche film sheet.

* * * * *